(12) United States Patent
Chern

(10) Patent No.: US 6,250,438 B1
(45) Date of Patent: Jun. 26, 2001

(54) DISC BRAKE FOR A BICYCLE

(75) Inventor: Bang-Shiong Chern, Taichung Hsien (TW)

(73) Assignee: Yih Cherng Co., Ltd. (TW)

( * ) Notice: Subject to any disclaimer, the term of this patent is extended or adjusted under 35 U.S.C. 154(b) by 0 days.

(21) Appl. No.: 09/493,705

(22) Filed: Jan. 28, 2000

(51) Int. Cl.[7] ............................. F16D 55/02; F16D 15/00; B62L 5/10
(52) U.S. Cl. ..................... 188/72.7; 188/72.3; 188/72.9
(58) Field of Search ................................ 188/72.7, 72.8, 188/72.9, 72.3

(56) References Cited

U.S. PATENT DOCUMENTS

| | | | | |
|---|---|---|---|---|
| 3,155,195 | * | 11/1964 | Brawerman | 188/73 |
| 4,022,301 | * | 5/1977 | Hansen | 188/72.1 |
| 4,633,978 | * | 1/1987 | Hoff | 188/71.7 |
| 4,838,386 | * | 6/1989 | Yoshigai | 188/24.12 |
| 5,038,895 | * | 8/1991 | Evans | 188/72.7 |
| 5,220,790 | * | 6/1993 | Allart et al. | 60/435 |

* cited by examiner

Primary Examiner—Robert J. Oberleitner
Assistant Examiner—Melody M. Burch
(74) Attorney, Agent, or Firm—William E. Pelton, Esq.

(57) ABSTRACT

A disc brake for a bicycle includes a casing having a recess and a through hole defined therein. The through hole communicates with the recess. A rotating block having to cams is received in the through hole of the casing and has a shaft partially extending through the casing. A press block is received in the through hole of the casing and has one side abutting the rotating block. A push rod is mounted between the rotating block and the press block. One of two brake pads is attached to one side of the recess of the casing and the other is aligned with and attached to the facing side of the press block. The two brake pads face each other. The two brake pads clamp a disc that is mounted on a wheel of a bicycle when the shaft of the rotating block is rotated by the lever.

7 Claims, 6 Drawing Sheets

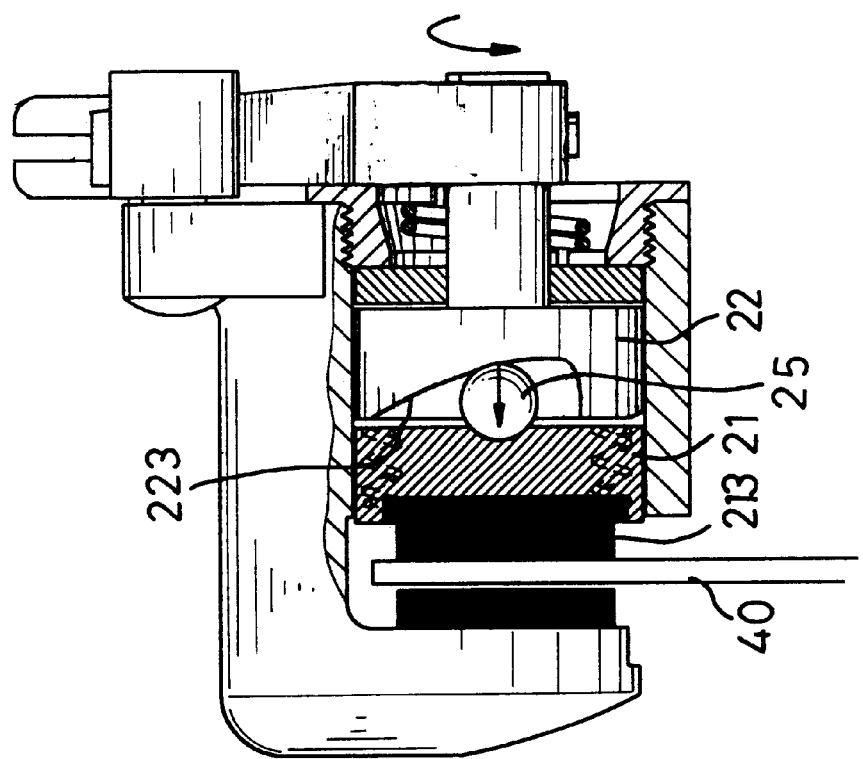
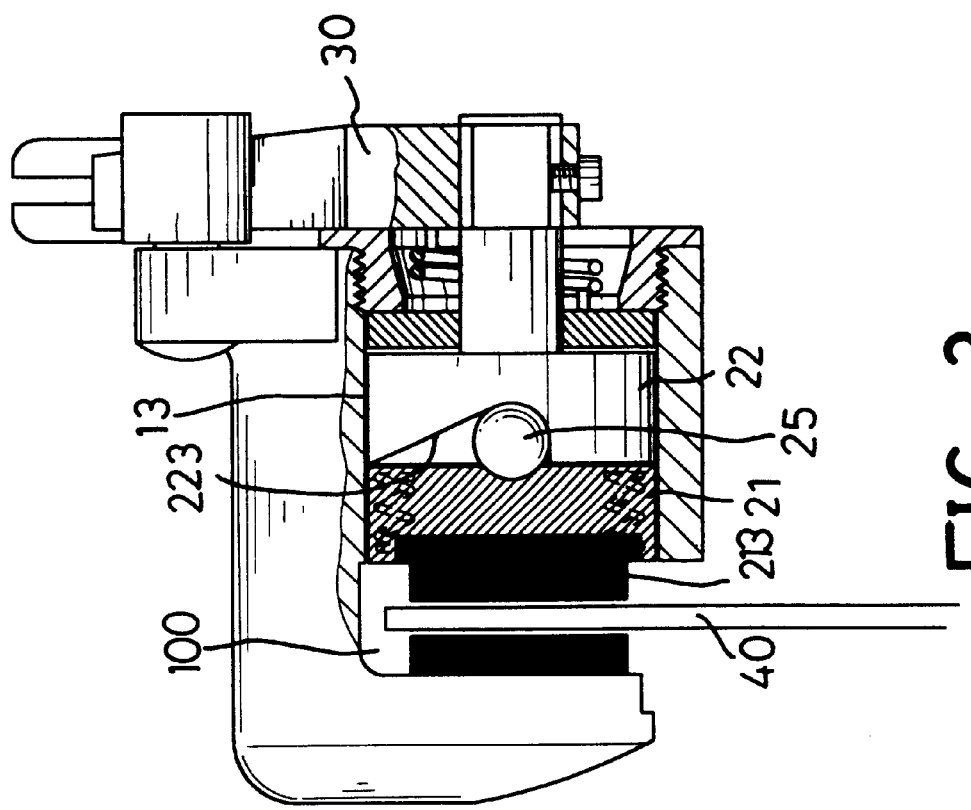
FIG. 3
FIG. 4

DISC BRAKE FOR A BICYCLE

BACKGROUND OF THE INVENTION

1. Field of the Invention

The present invention relates to a disc brake, and more particularly to a disc brake for a bicycle.

2. Description of Related Art

A conventional disc brake in accordance with the prior shown in FIGS. 6 and 7 comprises a casing (60) having a recess (61) and a chamber (601). The chamber (601) communicates with the recess (61) and has a through hole (602) in the closed end. A bushing (603) is securely received in the through hole (602). The conventional disc brake further comprises a disc (600) mounted on a wheel (not shown).

A push block (65) is securely received in the chamber (601) of the casing (60) and has a circular hole (654) defined in the center. One side the push block (65) abuts the closed end of the chamber (601) of the casing (60), and multiple elongated egg-shaped concave recesses (651) are formed in the second side around the hole (654). Each egg-shaped concave recesses (651) has a large diameter end (652) and a small diameter end (653) with the depth of the elongated egg-shaped concave recess (651) deeper at the large diameter end (652).

A rotating block (63) is received in the chamber (601) of the casing (60) with a shaft (64) extending from one end. The shaft (64) extends through the hole (654) in the push block (65) and the bushing (603) of the casing (60). The rotating block (63) has multiple concave recesses (631) that face and correspond to one of the elongated egg-shaped concave recesses (651). A steel ball (67) received between the corresponding circular recess (631) and elongated egg-shaped concave recess (651). In normal position, the steel ball (67) is received in the large diameter end (652) of the elongated egg-shaped concave recess (651) in the push block (65).

One of two brake pads (62) is attached to the free end of the rotating block (63) and the other is aligned with the first brake pad (62) and attached to the side of the recess (61) of the casing (60). A keyed lever (66) is attached to the free end of the shaft (64) and is held in place by a locking nut (660).

The shaft (64) and the rotating block (63) are moved away from the push block (65) when the lever (66) is pulled. When the lever (66) is pulled, the steel balls are moved from the large diameter end (652) of the elongated egg-shaped recess (651) to the to the small diameter end (653) thereby generating a pushing force. The force pushes the rotating block (63) to make the brake pads (62) approach and clamp the disc (600) that is mounted on a wheel in order to apply a braking force to the bicycle.

There is a certain distance from the centers of the steel balls to the center of the rotating block (63) and the push block (65). The force arm and the output moment are inversely proportional when the input moment is fixed. The active force of the disc brake is degraded, thereby reducing the effectiveness of the disc brake.

The present invention has arisen to mitigate and/or obviate the disadvantages of the conventional disc brake for a bicycle.

SUMMARY OF THE INVENTION

In accordance with one aspect of the present invention, a disc brake for a bicycle includes a casing having a recess and a through hole defined therein. The through hole communicates with the recess. A rotating block is received in the through hole of the casing and has a shaft partially extending through the casing. A press block is received in the through hole of the casing and has one side abutting the rotating block. A push rod is mounted between the rotating block and the press block. One of two brake pads is attached to one side of the recess of the casing and the other is attached to the other side of the press block. The two brake pads face each other. The two brake pads clamp a disc that is mounted on a wheel of a bicycle when the shaft of the rotating block is turned.

Further benefits and advantages of the present invention will become apparent after a careful reading of the detailed description with appropriate reference to the accompanying drawings.

BRIEF DESCRIPTION OF THE DRAWINGS

FIG. 3 is a front plan view in partial section of the disc brake for a bicycle in FIG. 1;

FIG. 4 is a front plan view in partial section of the disc brake for a bicycle in FIG. 1 when clamping the disc;

DETAILED DESCRIPTION OF THE INVENTION

Figure 1:
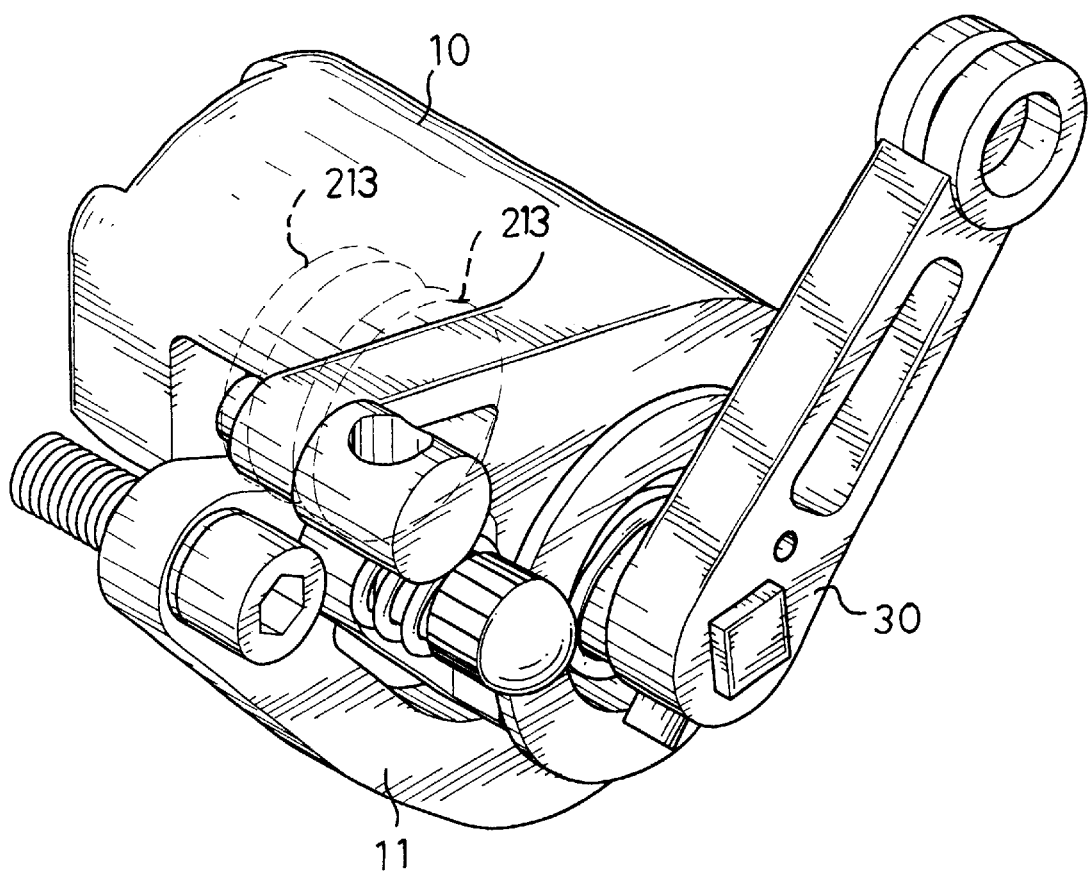
FIG. 1 is a perspective view of a disc brake for a bicycle.
Figure 2:
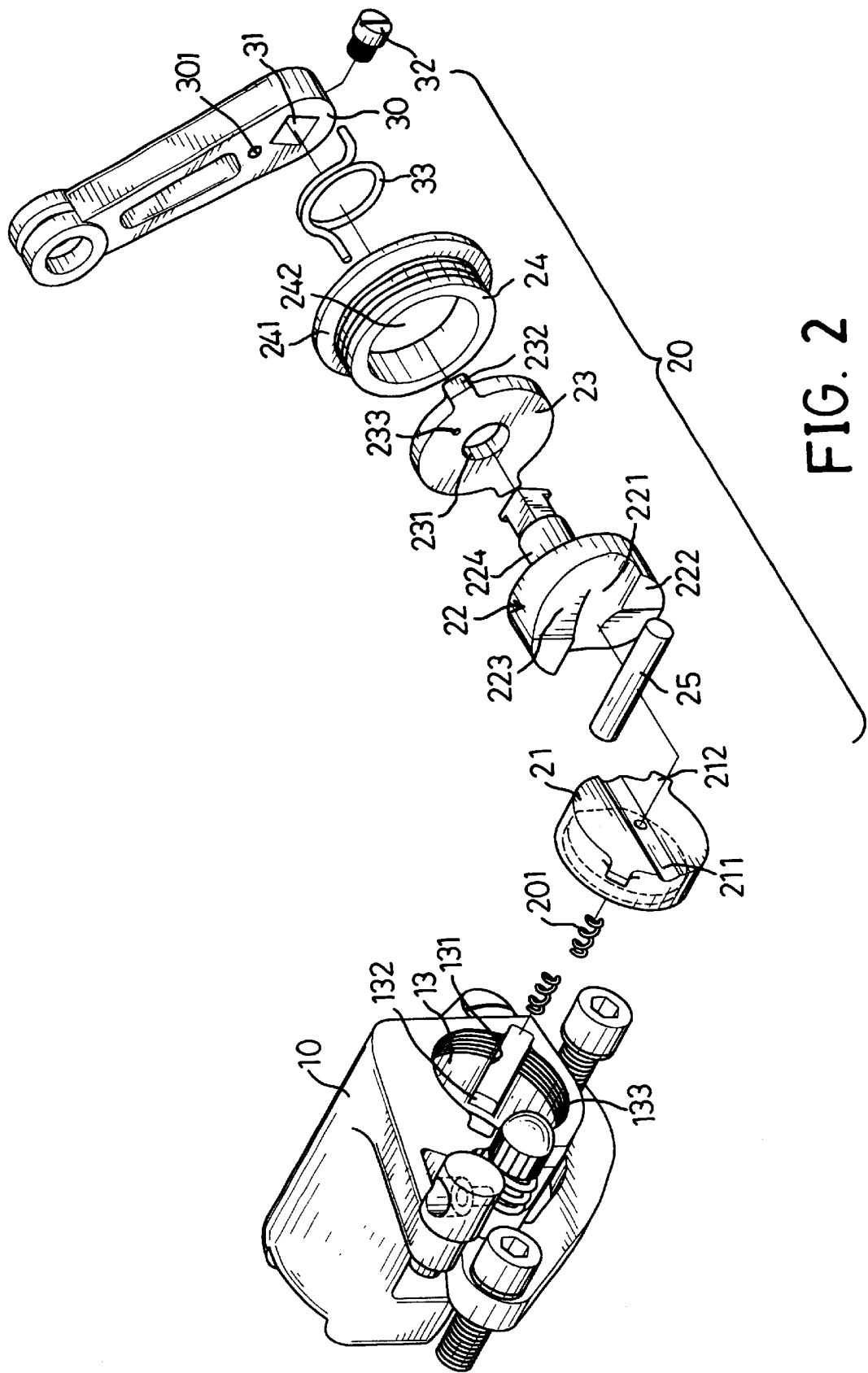
FIG. 2 is an exploded perspective view of the disc brake for a bicycle in FIG. 1.
Figure 5:
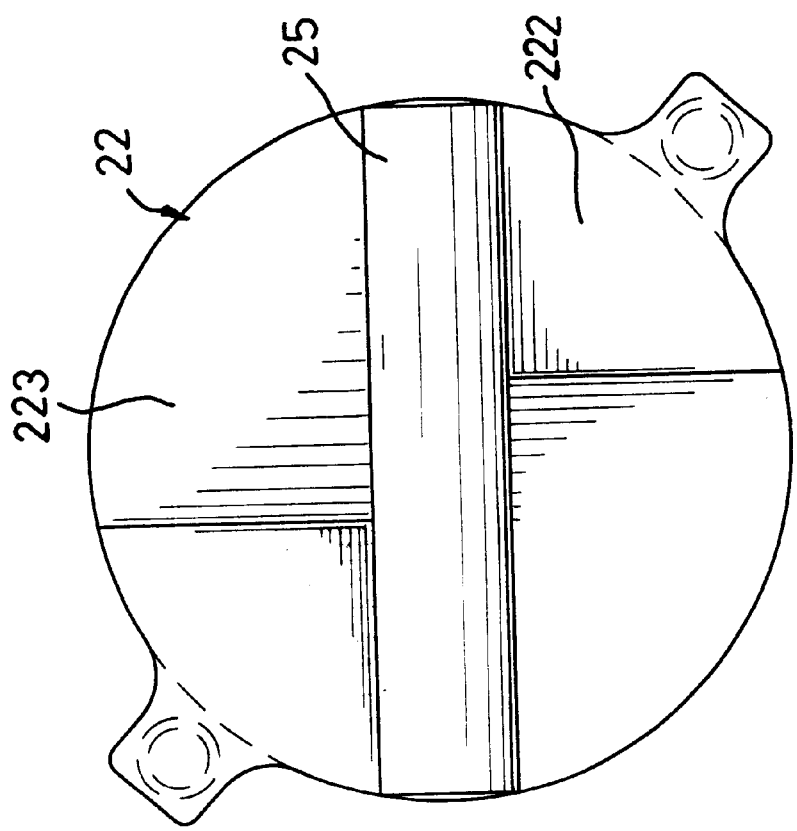
FIG. 5 is a side plan view of the rotating block and the push rod of the disc brake for a bicycle in FIG. 1.
Figure 6:
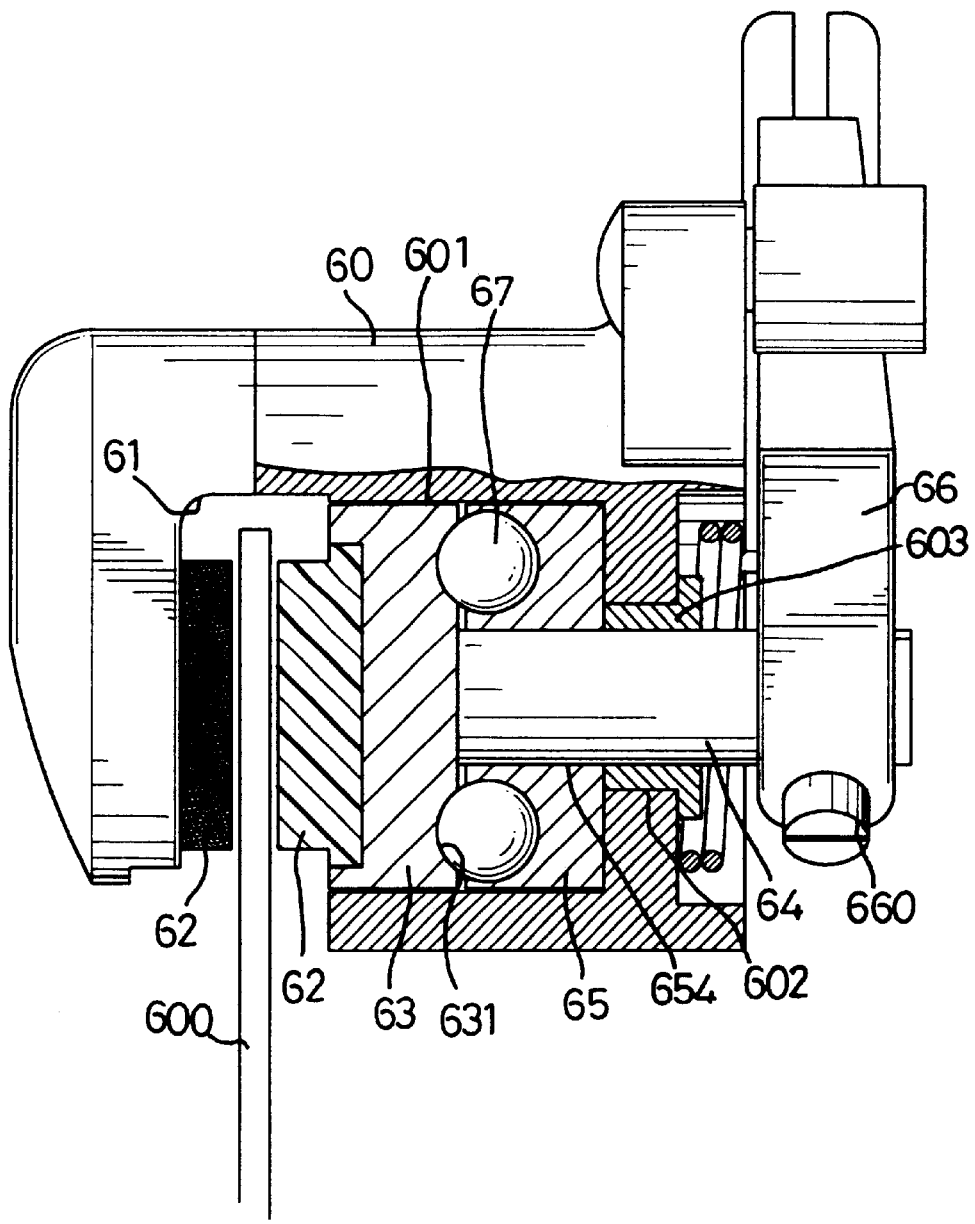
FIG. 6 is a front plan view in partial section of a conventional disc brake for a bicycle in accordance with the prior art.
Figure 7:
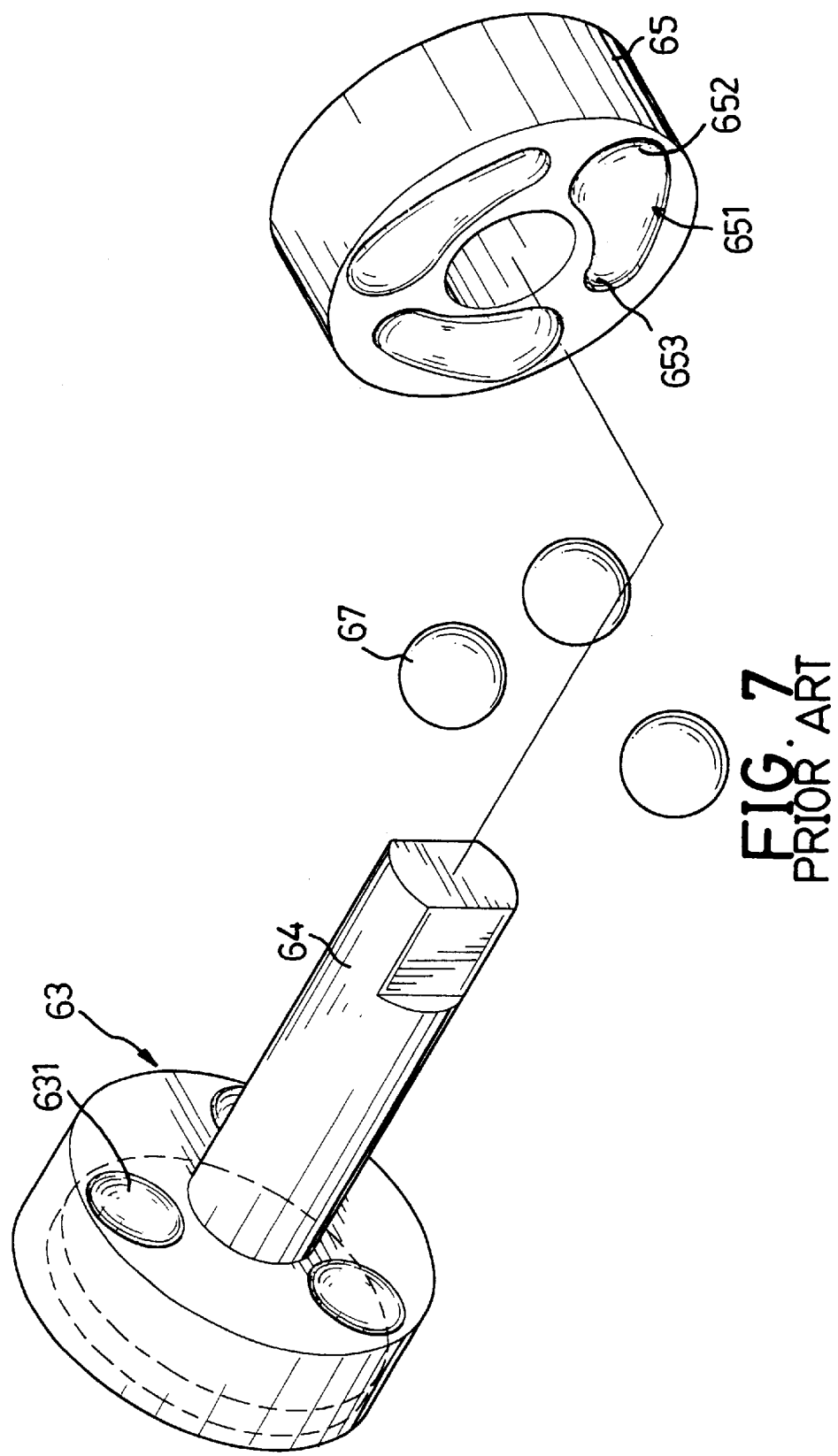
FIG. 7 is an exploded perspective view of the push block, the rotating block and the steel balls of the disc brake for a bicycle in FIG. 6.

Referring to the drawings and initially to FIGS. 1–3, a disc brake for a bicycle accordance with the present invention comprises a casing (10), a brake device (20) received in the casing (10) and a lever (30) attached to the brake device (20).

A recess (100) and a passage (13) are defined in the casing (10). The passage (13) communicates with the recess (100). The passage (13) includes at least one groove (131) defined in an inner sidewall thereof. The groove (131) has a stopper (132) formed near the recess (100). An interior thread is defined in the outside end of the passage (13). A bracket (11) is attached to the casing (10) and is mounted on the fork (not shown) of a bicycle (not shown).

The brake device (20) has a spring (201) received in the groove (131) of the casing (10). The spring (201) has one end abutting the stopper (132) of the groove (131). A press block (21) is received in the passage (13) and includes one side facing the recess (100) of the casing (10) and the other side having at least one lug (212) extending out therefrom and an arced groove (211) defined therein. The lug (212) is received in the groove (131) of the casing (10) and abuts the other end of the spring (201).

A rotating block (22) is received in the passage (13) of the casing (10). The rotating block (22) includes two cams (222) extending toward the press block (21) on one side from opposite ends of a diameter of the rotating block (22) and a shaft (224) extending from the center of the rotating block (22) on the other side. Each of the two cams (222) has an inclined portion (223) parallel to an arced groove (211) in the press block (21) and opposite to each other, thereby forming a slot (221) aligning with the arced groove (211) of the press block (21). The free end of the shaft (224) of the rotating block (22) is polygonal. A push rod (25) is mounted between the arced groove (211) of the press block (21) and the slot (221) of the rotating block (22).

A positioning plate (23) is received in the passage (13) of the casing (10). The positioning plate (23) has at least one protrusion (232) extending out from the edge and received in the groove (131) of the casing (10). The positioning plate (23) has a cavity (231) defined in the center to allow the shaft (224) to extend therethrough and a first bore (233) defined off center from the cavity (231).

A retaining ring (24) is screwed into the interior thread of the passage (13) of the casing (10) to hold the press block (21), the rotating block (22) and the positioning plate (23) in place. The retaining ring (24) includes a through hole (242) defined therein to allow the shaft (224) of the rotating block (22) to penetrate and a shoulder (241) extending radially from the exterior edge to abut the casing (10) after screwing the retaining ring (24) into the passage (13).

The lever (30) has a polygonal hole (31) defined in one end to fit over the free end of the shaft (224) and is held in place by a locking nut (32). The lever has a second bore (301) defined near the polygonal hole (31). A return spring (33) is mounted between the positioning plate (23) and the lever (30). The return spring (33) has one end received in the first bore (233) of the positioning plate (23) and the other end received in the second bore (301) of the lever (30).

The disc brake for a bicycle further includes a disc (40) mounted on a wheel (not shown) of the bicycle.

One of two brake pads (213) is attached to one side of the recess (100) of the casing (10) and the other is aligned with and attached to the facing side of the press block (21). The two brake pads (213) face each other. The two brake pads (213) clamp a disc (40) that is mounted on a wheel of a bicycle when the shaft (224) of the rotating block (22) is rotated by the lever (30).

The shaft (224) and the press block (21) are moved when the lever (30) is pulled. When the lever (30) is pulled, the push rod (25) is moved from the slot (221) to the inclined portion (223) of the cam (222) and generates a pushing force. The force pushes the press block (21) to make the brake pads (213) approach and clamp the disc (40) that is mounted on a wheel in order to brake the bicycle.

Although the invention has been explained in relation to its preferred embodiment, it is to be understood that many other possible modifications and variations can be made without departing from the spirit and scope of the invention as hereinafter claimed.

What is claimed is:

1. A disc brake for a bicycle comprising:
   a disc and a casing including a recess and a passage defined therein, said passage communicating with said recess;
   a bracket attached to said casing;
   at least one groove defined in an inner sidewall of said passage and having a stopper formed near said recess;
   a spring received in said groove of said casing and having one end abutting said stopper of said groove;
   a press block received in said passage with one side facing said recess of said casing and at least one lug extending out from the other side and an arced groove defined therein, said lug received in said groove of said casing and abutting the other end of said spring;
   a rotating block received in said passage of said casing, said rotating block with two cams extending from opposite ends of a diameter of one side of said rotating block and a shaft extending from a center of the other side of said rotating block, each of said two cams having an inclined portion extending to said press block, said inclined portion being parallel to said arced groove of said press block and opposite to each other, thereby forming a slot aligning with said arced groove of said press block;
   a push rod mounted between said arced groove of said press block and said slot of said rotating block;
   a retaining ring screwed into said passage of said casing to hold said press block and said rotating block in place, said retaining ring having a through hole defined therein to allow said shaft of said rotating block to penetrate; and
   a lever including a hole defined in one end thereof to securely receive a free end of said shaft said lever being and held in place by a locking piece.

2. The disc brake for a bicycle as claimed in claim 1, wherein said free end of said shaft is polygonal and said hole of said lever is polygonal.

3. The disc brake for a bicycle as claimed in claim 1 further comprising a positioning plate mounted between said rotating block and said retaining ring, said positioning plate having at least one protrusion extending out therefrom and received in said groove of said casing, said positioning plate having a cavity defined in a center thereof to allow said shaft to penetrate and a first bore defined off said center from said cavity.

4. The disc brake for a bicycle as claimed in claim 3, wherein said lever includes a second bore defined near said hole therein and a return spring, said return spring having one end received in said first bore of said positioning plate and the other end received in said second bore of said lever.

5. The disc brake for a bicycle as claimed in claim 1, wherein said passage of said casing includes one end opposite to said recess having an interior thread defined therein.

6. The disc brake for a bicycle as claimed in claim 5, wherein said retaining ring includes an external thread formed on one end to screw into said interior thread of said passage and a shoulder extending radially out from the other end to abut said casing.

7. The disc brake for a bicycle as claimed in claim 1, wherein said locking piece of said lever is a locking nut.

* * * * *